United States Patent
Xu et al.

(10) Patent No.: US 11,940,560 B2
(45) Date of Patent: Mar. 26, 2024

(54) ULTRA-LONG SUBWAVELENGTH GRATING BASED OPTICAL ANTENNA FOR OPTICAL PHASED ARRAY

(71) Applicant: Harbin Institute of Technology, Shenzhen, Shenzhen (CN)

(72) Inventors: Xiaochuan Xu, Shenzhen (CN); Jiaxin Chen, Shenzhen (CN); Wanxin Li, Shenzhen (CN); Yong Yao, Shenzhen (CN)

(73) Assignee: Harbin Institute of Technology, Shenzhen, Shenzhen (CN)

( * ) Notice: Subject to any disclaimer, the term of this patent is extended or adjusted under 35 U.S.C. 154(b) by 129 days.

(21) Appl. No.: 17/168,089

(22) Filed: Feb. 4, 2021

(65) Prior Publication Data
US 2022/0037780 A1 Feb. 3, 2022

(30) Foreign Application Priority Data
Jul. 28, 2020 (CN) .......................... 202010736857.5

(51) Int. Cl.
| | | |
|---|---|---|
| *H01Q 3/26* | (2006.01) | |
| *G01S 7/481* | (2006.01) | |
| *G02B 6/124* | (2006.01) | |
| *G02F 1/295* | (2006.01) | |

(52) U.S. Cl.
CPC ............ *G01S 7/4814* (2013.01); *G02B 6/124* (2013.01); *G02F 1/2955* (2013.01)

(58) Field of Classification Search
CPC ...... H01Q 3/2676; G01S 7/4814; G02B 6/14; G02B 6/124; G02F 1/292
See application file for complete search history.

(56) References Cited

U.S. PATENT DOCUMENTS

| | | | | |
|---|---|---|---|---|
| 6,374,001 | B1 * | 4/2002 | Bozeat .................... | G02F 1/025 385/40 |
| 10,429,588 | B1 * | 10/2019 | Yoo ......................... | G02B 6/124 |
| 11,435,586 | B2 * | 9/2022 | Calafiore ........... | G02B 26/0833 |
| 2012/0224810 | A1 * | 9/2012 | Doerr ..................... | G02B 6/124 427/163.2 |
| 2017/0315420 | A1 * | 11/2017 | Watts ...................... | G02F 1/025 |
| 2021/0231865 | A1 * | 7/2021 | Nezhad .............. | G02B 26/0808 |
| 2021/0263221 | A1 * | 8/2021 | Puckett .............. | G02B 6/12011 |

FOREIGN PATENT DOCUMENTS

CN        111367097        *  7/2020

* cited by examiner

*Primary Examiner* — Awat M Salih
(74) *Attorney, Agent, or Firm* — Taboada Law Firm, PLLC; John M. Taboada

(57) ABSTRACT

An ultra-long sub-wavelength grating as an optical antenna for optical phased arrays includes a top structure and a bottom structure which are vertically stacked. The bottom structure is made of a material with a refractive index lower than a refractive index of the top structure. The top structure is made of a material with a refractive index higher than that of the bottom structure. A strip waveguide is disposed in the middle of the top structure. subwavelength blocks are disposed periodically on two sides of the straight strip waveguides. The invention has the following beneficial effects. The structure could increase the effective length of the grating; uniform near field distribution can be achieved by controlling the positions of the subwavelength blocks. The structure is simpler with lower fabrication requirements and lower cost.

4 Claims, 4 Drawing Sheets

ULTRA-LONG SUBWAVELENGTH GRATING BASED OPTICAL ANTENNA FOR OPTICAL PHASED ARRAY

CROSS-REFERENCE TO RELATED APPLICATION

This application claims the priority benefit of China application serial no. 202010736857.5, filed on Jul. 28, 2020. The entirety of the above-mentioned patent application is hereby incorporated by reference herein and made a part of this specification.

BACKGROUND OF THE INVENTION

1. Technical Field

The invention relates to optical phased array, in particular to an ultra-long subwavelength grating based optical antennas for optical phased array.

2. Description of Related Art

Beam steering technology has a broad application in many fields such as light detection and ranging (LiDAR), free-space optical communication and holographic display. It has received intensive attention in the past decades. Designing a beam steering system with a small diffraction divergence angle, high emission efficiency, large steering range and high steering speed is a goal that has been pursued by those skilled in the art all the time.

With the rapid advancement of large-scale silicon photonic integration technology, optical phased arrays (OPAs) have been studied intensively in recent years for its potential to achieve high stability, compact and low-cost beam steering systems. One-dimensional (1D) optical phased arrays are achieved by controlling the phase difference between adjacent gratings by phase shifters. However, 1D beam steering limits the scope of applications. In order to realize 2D beam steering, the combination of wavelength and phase tuning is an attractive approach. However, because of the high refractive index contrast between silicon and cladding materials on silicon-on-insulator (SOI) and the limited fabrication precision, the perturbations are so strong that the light can only propagate a short length in the grating, leading to the large diffraction divergence angle.

In order to reduce the diffraction divergence angle, the effective length of the grating needs to be increased. Many structure designs have been reported to reduce the grating strength, such as shallow grating, sidewall corrugated grating, multilayer grating, and lower index contrast platform. Shallow grating and sidewall corrugated grating reduce the grating strength by reducing the etching depth. Multilayer grating weakens the influence of gratings on light by separating gratings and waveguides in the vertical direction. For lower index contrast platform, the grating strength is weakened by reducing the effective refractive index difference of grating.

These methods can somewhat increase the grating length but also suffer from their own limitations. Specifically, shallow etched grating and sidewall corrugated grating inevitably increases requirements of the fabrication process; multilayer grating requires double layer fabrication, increasing fabrication complexity and cost; lower index contrast platform such as the Si3N4 requires a wider waveguide to bind the light and it has smaller angular dispersion which limits the steering range with wavelength change. In a word, these methods increase the grating length at the price of increased fabrication complexity and cost.

BRIEF SUMMARY OF THE INVENTION

To solve the problems of the prior art, the invention provides an ultra-long subwavelength grating as the optical antenna for optical phased array.

The subwavelength grating comprises a top and a bottom structure which are vertically stacked, wherein the bottom structure is made of a material with a refractive index lower than top structure, such as various oxides. The top structure is made of a material with the refractive index higher than bottom, such as silicon, silicon nitride, aluminum nitride and aluminum oxide. A strip waveguide is formed in the middle of the top structure. subwavelength blocks are placed within the evanescent field of the strip waveguide to form the grating structure. When the sizes and positions of the subwavelength blocks are selected properly, the effective length of the grating can be greatly increased. By adjusting the size and position of the subwavelength blocks in different periods, uniform or arbitrary shape near field distribution can be generated.

According to some embodiments, the thickness of the strip waveguide and thicknesses of the subwavelength blocks are the same.

According to some embodiments, the width of the central strip waveguide is smaller than 1 μm.

According to some embodiments, the gap between edges of the strip waveguide and edges of the subwavelength blocks is smaller than 1 μm.

According to some embodiments, the subwavelength blocks on the two sides of the strip waveguide are formed symmetrically.

The invention has the following beneficial effects: the subwavelength grating is used to reduce the grating strength to propagating light, so that the effective length of the grating is increased, and thus the diffraction divergence angle is reduced. The near-field distribution of the field can be controlled by means of the structures arrayed at unequal intervals. The structure is simpler with lower fabrication requirements and lower cost.

DETAILED DESCRIPTION OF THE INVENTION

The invention will be further explained below in conjunction with the accompanying drawings and specific embodiments.

As shown in FIG. 1 to FIG. 4, the subwavelength grating is used to form the optical antenna for optical phased array, wherein a bottom layer of the subwavelength grating is an oxide layer with a thickness of 2 μm such as a silicon dioxide layer 1, and a top layer is the subwavelength grating structure 2 made from silicon. A strip waveguide 21 with a width w1 is disposed in the middle of the subwavelength grating structure 2, wherein subwavelength blocks 22 with a width w2 are periodicity disposed on two sides of the strip waveguide 21 and are at positions spaced apart from the two sides of the strip waveguide 21 by a distance d. The subwavelength grating structure 2 is etched on an SOI (Silicon-on-Insulator) platform (not shown) in such a manner: firstly, the silicon dioxide layer 1 is etched, then the silicon strip waveguide 21 and subwavelength blocks 22 are etched on the silicon dioxide layer 1, the strip waveguide 21 in the middle of the subwavelength grating structure 2 and the subwavelength blocks 22 on two sides of the straight strip waveguide 21 have the same thickness, which is 220 nm as shown. So only one standard etching of a depth of 220 nm is required and can be completed in one lithography cycle. Regarding other structures described in the description of the related art, an extra etching process is required for etching other depth which increases the fabrication complexity. As a result, compared with the prior art, the manufacturing process of the structure of this disclosure is relatively simple. The basic principle of decreasing the grating strength in this subwavelength grating structure is that the transmission strip waveguide and the grating formed by subwavelength blocks are separated in the horizontal direction. FIG. 5 is a mode field distribution in direction y. In the mode field distribution diagram, the dash line indicates the field distribution of a strip waveguide without the subwavelength blocks, and the black line indicates the mode distribution of the strip waveguide with the subwavelength blocks. As shown in FIG. 5, it can be seen the existence of the subwavelength blocks mainly interact with the evanescent field, resulting in small perturbation strength.

By controlling the positions and sizes of the subwavelength blocks, subwavelength grating structure with different effective lengths can be achieved.

The technical effects fulfilled by the subwavelength grating structure is introduced below. 1 mm long subwavelength grating structure is simulated to verify the feasibility of the structure.

Figure 1:
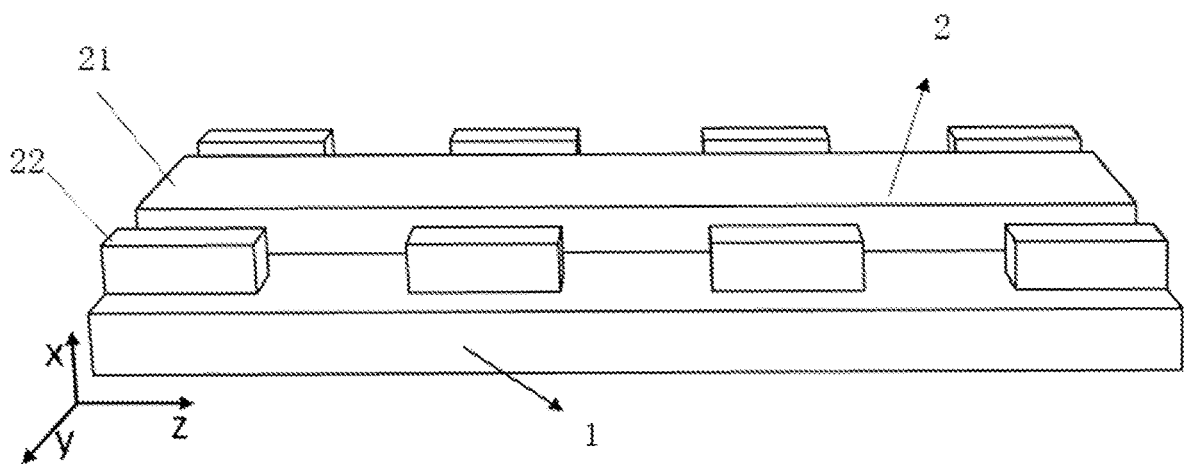
FIG. 1 is a perspective view of the subwavelength grating of the invention.
Figure 2:
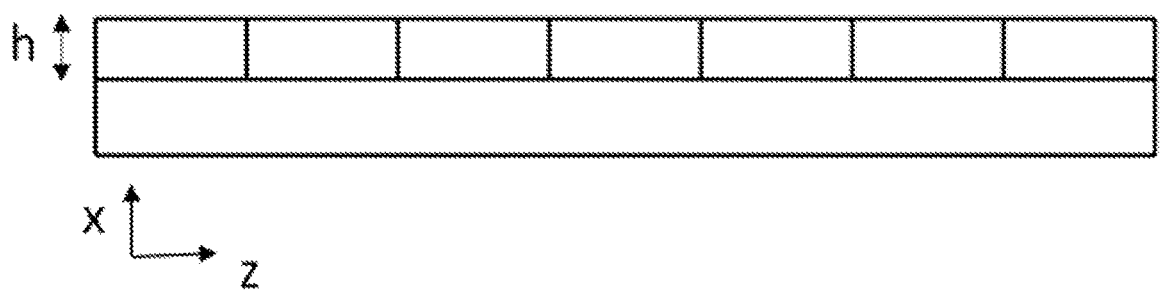
FIG. 2 is a front view of the subwavelength grating of the invention.
Figure 3:
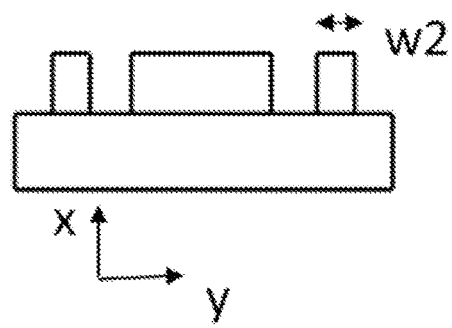
FIG. 3 is a left view of the subwavelength grating of the invention.
Figure 4:
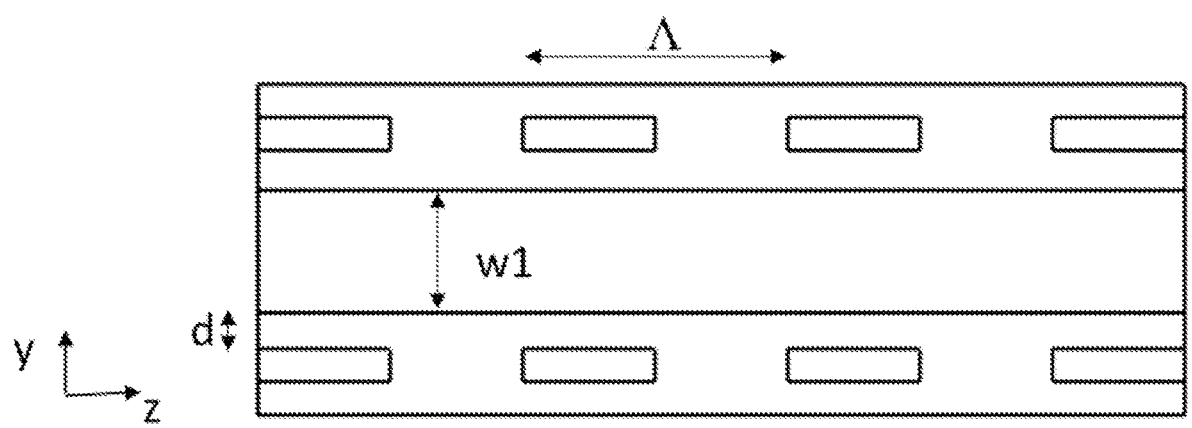
FIG. 4 is a top view of the subwavelength grating provided by the invention.
Figure 5:
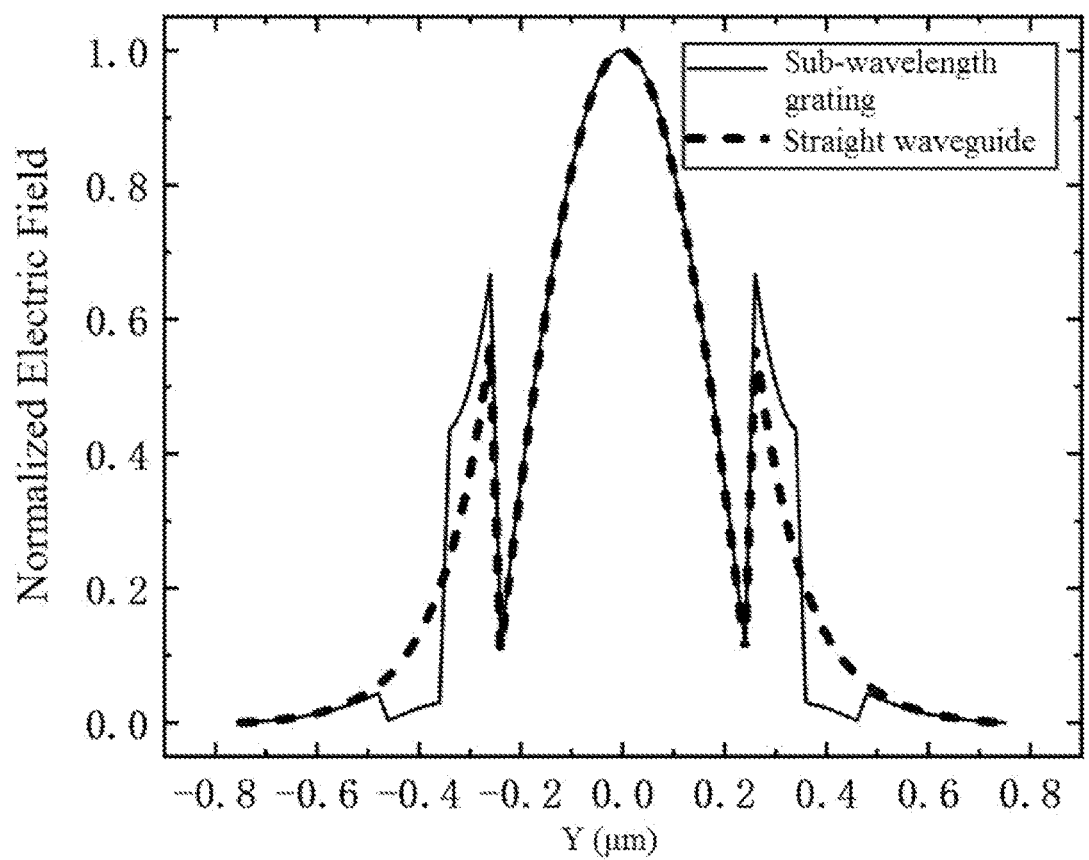
FIG. 5 is the mode field distribution of the sub-wavelength grating in direction y of the invention.
Figure 6:
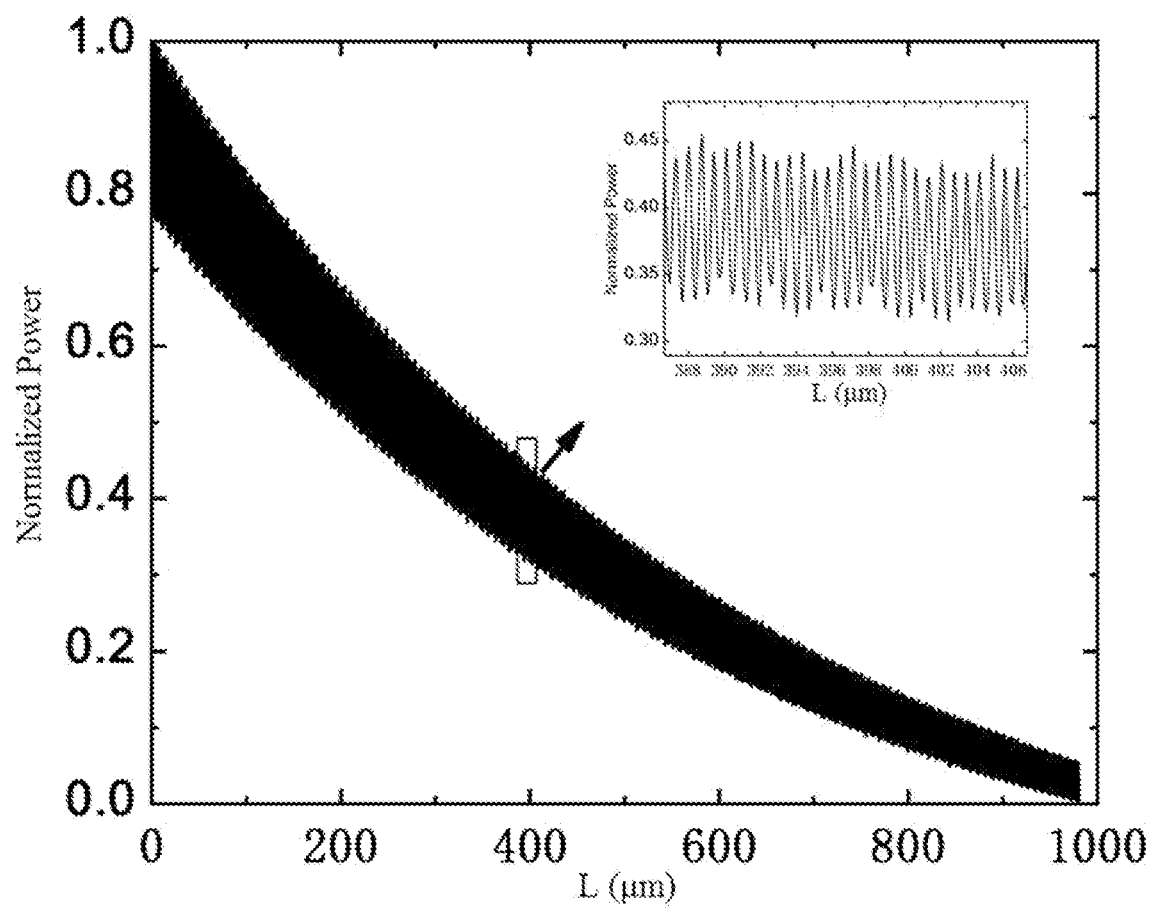
FIG. 6 is a near-field distribution of 1 mm long sub-wavelength grating of the invention.
Figure 7:
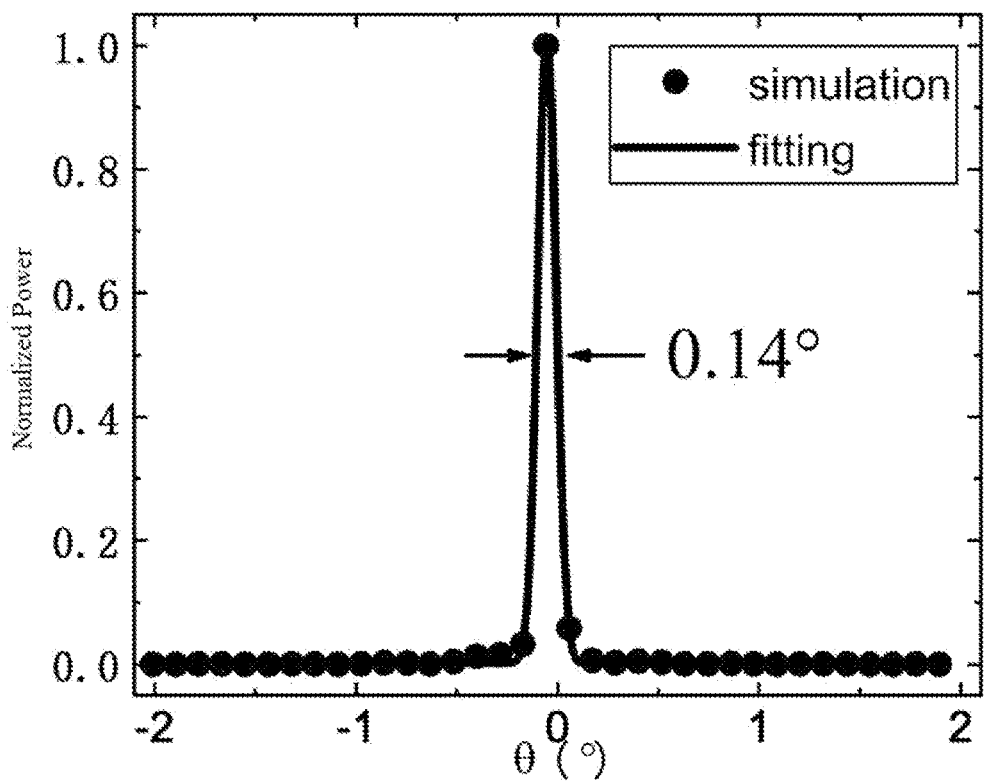
FIG. 7 is the schematic of the far-field divergence angle of the 1 mm long sub-wavelength grating of the invention.

Case 1: the parameters of the subwavelength grating structure are set as follows: w1=500 nm, d=100 nm, w2=120 nm, Λ=700 nm, and h=220 nm (the meanings of the parameters are shown in FIG. 2 to FIG. 4), and near-field and far-field distribution of emitted light is simulated. FIG. 6 shows power attenuation in the subwavelength grating structure. As shown in FIG. 6, the power decays exponentially and could propagate one millimeter before attenuating to around 10% of its initial power as expected. FIG. 7 shows the far-field divergence angle of the subwavelength grating structure in the transmission direction. As shown in FIG. 7, the far-field divergence angle is around 0.14°, which means that after the emitted light is transmitted by 50 m in free space, the spot size is only about 25 cm. To sum up, under the precondition that the feature size of this subwavelength grating structure is greater than 100 nm, a millimeter-length grating structure is realized by means of a simple structure, and the far-field divergence angle is reduced.

Figure 8:
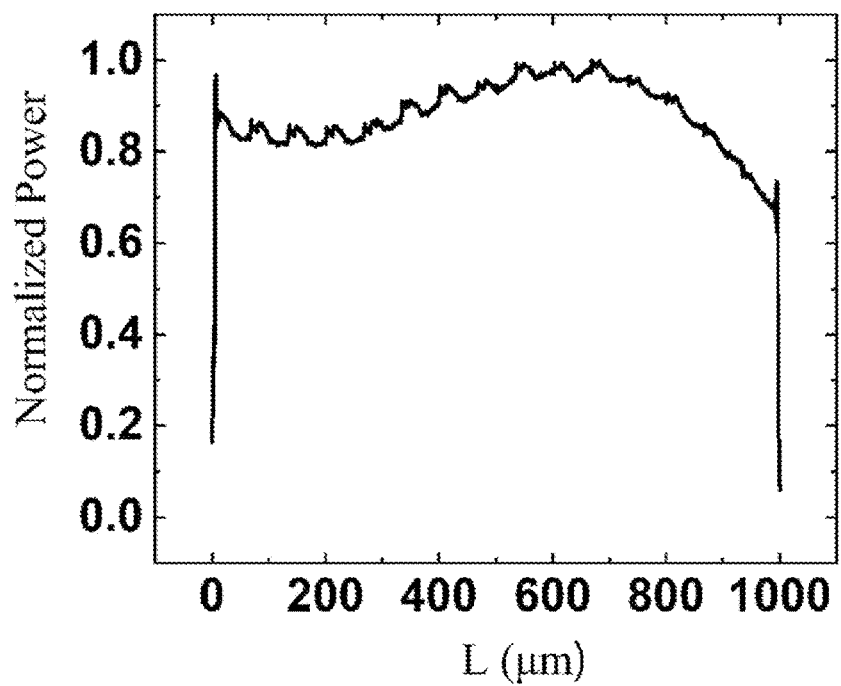
FIG. 8 is a near-field distribution of near-field of 1 mm long subwavelength grating with apodization.

Case 2: the parameters of the subwavelength grating structure are set as follows: w1=400 nm, d=100 nm, w2=120-350 nm (quadratically varying with the increase of number of periods), Λ=800 nm, and h=220 nm (the meanings of the parameters are shown in FIG. 2 to FIG. 4), and the near-field distribution of the emitted light is shown in FIG. 8. As shown in FIG. 8, the light can be transmitted by 1 mm in the subwavelength grating structure and is emitted approximately uniformly.

The subwavelength grating structure provided by the invention can be used as optical antenna for optical phased array and can achieve millimeter-length grating with different light near field distributions. Compared with other long grating structures, the subwavelength grating structure is easier to manufacture, can reduce the far-field divergence angle of the optical phased array and can control the near-field distribution, thus having better application performance in the fields of LiDAR, free-space optical communication, holographic projection and the like.

The subwavelength grating structure provided by the invention has the following advantages:

(1) The subwavelength grating structure has a feature size greater than 100 nm and is manufactured through one etching depth, thus being easier to manufacture.

(2) The subwavelength grating structure can realize an emission grating with a millimeter-level effective length and greatly reduces the far-field divergence angle.

(3) Different near-field distribution can be realized according to different requirements.

The invention is further expounded above in conjunction with specific preferred embodiments, but the specific implementation of the invention is not limited to the above description. Those ordinarily skilled in the art can make different simple extrapolations or substitutions without departing from the conception of the invention, and all these extrapolations or substitutions should also fall within the protection scope of the invention.

What is claimed is:

1. An ultra-long subwavelength grating as the optical antenna for optical phased arrays, comprising a top structure and a bottom structure which are vertically stacked,
    wherein a refractive index of the bottom structure is lower than a refractive index of the top structure,
    wherein a strip waveguide is formed in a middle of the top structure, and subwavelength blocks are disposed in the top structure with a gap between edges of the strip waveguide and edges of the subwavelength blocks and with periodicity on two sides of the strip waveguide and the periodicity of the subwavelength blocks are arrayed in a direction along the strip waveguide to form the grating structure.

2. The ultra-long subwavelength grating as the optical antenna for optical phased arrays according to claim 1, wherein a thickness of the strip waveguide and thicknesses of the subwavelength blocks are the same.

3. The ultra-long subwavelength grating as the optical antenna for optical phased array according to claim 1, wherein a width of the strip waveguide is smaller than 1 μm.

4. The ultra-long subwavelength grating as the optical antenna for optical phased array according to claim 1, wherein a distance between edges of the straight waveguide and edges of the subwavelength blocks is smaller than 1 μm.

* * * * *